United States Patent [19]

Tokoi et al.

[11] Patent Number: 4,937,155

[45] Date of Patent: Jun. 26, 1990

[54] SODIUM-SULPHUR CELL, METHOD OF OPERATING SAME AND METHOD OF LOAD LEVELLING USING THE SAME

[75] Inventors: Hiromi Tokoi, Tohkai; Hisashi Souma, Hitachi; Naohisa Watahiki, Mito, all of Japan

[73] Assignee: Hitachi, Ltd., Tokyo, Japan

[21] Appl. No.: 374,152

[22] Filed: Jun. 30, 1989

[30] Foreign Application Priority Data

Jul. 1, 1988 [JP] Japan .................................. 63-162552

[51] Int. Cl.$^5$ .......................................... H01M 10/39
[52] U.S. Cl. ..................................................... 429/104
[58] Field of Search ........................................... 429/104

[56] References Cited

U.S. PATENT DOCUMENTS

| | | | |
|---|---|---|---|
| 3,951,689 | 4/1976 | Ludwig | 429/27 |
| 4,029,858 | 6/1977 | Evans et al. | 429/104 |
| 4,076,903 | 2/1978 | Sudworth et al. | 429/104 |
| 4,104,448 | 8/1978 | Gibson et al. | 429/104 |

FOREIGN PATENT DOCUMENTS

6412470 of 1964 Japan .

*Primary Examiner*—Donald L. Walton
*Attorney, Agent, or Firm*—Antonelli, Terry, Stout & Kraus

[57] ABSTRACT

In a sodium-sulphur cell, liquid sodium is anodic reactant, sulphur and sodium polysulphide are cathodic reactants and sodium ions are conducted by a solid electrolyte. To increase cell capacity and improve safety, a storage region for cathodic reactants is provided away from said solid electrolyte and containing said cathodic reactants in the form of two contacting layers of immiscible liquids formed by gravitational separation. Liquid sulphur being stored does not contact the solid electrolyte. The sodium may also be stored out of contact with the electrolyte. Capillary-action means for feeding the sodium polysulphide from the two liquid layers to the cathode reaction, and for feeding sodium to the anode reaction are included.

21 Claims, 6 Drawing Sheets

SODIUM-SULPHUR CELL, METHOD OF OPERATING SAME AND METHOD OF LOAD LEVELLING USING THE SAME

BACKGROUND OF THE INVENTION

1. Field of the Invention

The invention relates to sodium-sulphur cells and methods of operating them. While sodium-sulphur cells have many possible applications, they are considered particularly suitable for use in storing electrical power to provide load levelling, e.g. charging during off peak power demand periods and discharging during peak demand periods, and in electric vehicles.

2. Description of the Prior Art

Considerable efforts have been made in recent years to develope sodium-sulphur batteries, which have a high theoretical specific energy of 760 Whkg$^{-1}$, though in practice at present the aim is to achieve an actual specific energy of 100 to 150 Whkg$^{-1}$. A sodium-sulphur cell has advantages that it does not undergo self-discharge and is particuarly suitable for large scale energy storage.

Figure 2:
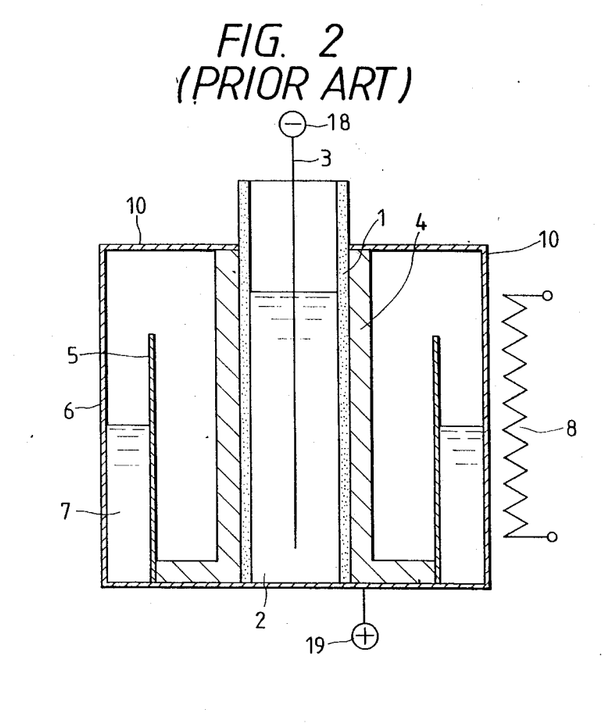
FIG. 2 is a vertical sectional view of a prior art sodium-sulphur cell, as described above.

Several sodium-sulphur cells are proposed in U.S. Pat. No. 3,951,689. One form of cell disclosed in this patent is shown in FIG. 2 of the present drawings. This cell has a ceramic solid electrolyte made of $\beta''$-alumina 1 enclosing liquid sodium 2 which is the anodic reactant. The anode lead 3 is inserted into the sodium 2. Outside the tubular electrolyte 1 is a cathodic reaction region 4 formed of porous graphite felt which includes a wider region at the base of the cell. The cathodic reactants are sulphur and sodium polysulphide. The sodium polysulphide is present in the felt. The sulphur 7 is kept in a separate compartment at the periphery of the cell defined by an internal wall 5 and the peripheral external wall 6. The external walls 6,10 act as the cathode. A heater indicated at 8 surrounds the cell.

During discharge operation of this cell, the sulphur store 7 is maintained at higher temperature than the cathodic reaction region 4, so that stored sulphur is vaporised and condenses in the cathodic reaction region 4 to cause a cell reaction. During charging, on the other hand, the sulphur in the store 7 is kept cooler than the cathodic reaction region 4, so that sulphur in the cathodic reaction region is vaporised and condenses in the store 7.

This cell attempts to remove the perceived defect of the prior conventional sodium sulphur cell in which both liquid sulphur and liquid polysulphide are present in the felt of the cathodic reaction region 4. This defect is that the polysulphide becomes saturated with sulphur so that the formation of further elemental sulphur in the cathodic reaction during charging limits the recharging operation. The cell of FIG. 2 removes the sulphur to a remote store.

In another embodiment illustrated in U.S. Pat. No. 3,951,689, a remote polysulphide store is provided, from which liquid polysulfide travels to the cathodic reaction means by the wicking action of a felt.

The cell of U.S. Pat. No. 3,951,689 suffers from the defect that temperature differences must be maintained between the sulphur storage region and the cell reaction region, and this temperature difference must be varied according to the operation of the cell. This is complex and cumbersome.

Furthermore, both the cell of U.S. Pat. No. 3,951,689 and the prior conventional cell described above have the disadvantage that if the ceramic electrolyte is broken, reactants of the cell immediately mix and instantaneous reaction takes place, resulting in catastrophic destruction of the cell. A second disadvantage is that the cell capacity depends upon the thickness of the felt region storing at least the polysulphide of the cathodic reactants. If the thickness of this region is increased, the cell resistance also increases, thus limiting the capacity of the cell.

It is mentioned that the causes of fracture of the $\beta''$-alumina solid electrolyte used in sodium-sulphur cells may be any one of (i) impurities in the liquid sodium, (ii) a current concentration above a certain critical level, and (iii) mechanical shock.

U.S. Pat. No. 4,029,858 proposes a partial solution to the problem of mixing of the reactants on fracture of the electrolyte, by providing a tube which contacts the liquid sodium, within the solid electrolyte tube. The outlet for sodium is at the bottom of the tube and liquid sodium moves to contact the inner wall of the electrolyte tube by a wicking action in the space between the storage tube and the electrolyte. However, in this arrangement, fracture of the solid electrolyte may lead to continuous slow engagement of the cell reactants.

SUMMARY OF THE INVENTION

It is one object of the present invention to provide a sodium-sulphur cell which is safer, and in particular in which the risk of catastrophic destruction in the event of breakage of the electrolyte is reduced or avoided.

It is another object of the invention to provide a sodium-sulphur cell which can operate with high efficiency and high storage capacity, and without the need for different temperatures at different parts of the cell.

It is a further object to increase the capacity of the cell.

In brief, the present invention provides a sodium-sulphur cell which has a storage region for cathodic reactants away from the solid electrolyte and containing the cathodic reactants in the form of two contacting layers of immiscible liquids formed by gravitational separation. Liquid sulphur and liquid polysulphide stored in this manner does not contact the solid electrolyte. Sulphur vapour passes from a storage region to the cathodic reaction region during discharge, and during charge sodium polysulphide is supplied from the storage region to the cathodic reaction region, preferably by the action of capillary force. Since the stored cathodic reactants are out of contact with the solid electrolyte, it can easily be arranged that the cell reactants do not mix, if the solid electrolyte breaks.

In a preferred form of the invention, the liquid sodium is also stored at a storage region away from the solid electrolyte, and is fed to and from the anodic reaction zone as required, preferably by capillary force. This further increases safety. Furthermore, according to the invention, one or more shutter means may be provided to isolate the reactants from each other, in the event of accident. These shutter means may be actuated by a vibration sensor, when vibration over a predetermined threshold level occurs.

A high cell capacity is obtainable, because the cathodic reactants are stored away from the cell, so that the volume of the cathodic reactant store does not determine the resistance of the cell. Accordingly, a high capacity cell of low resistance can be obtained.

BRIEF INTRODUCTION OF THE DRAWINGS

Embodiments of the ivention will now be described by way of non-limitative example with reference to the accompanying drawings, in which.

DESCRIPTION OF THE PREFERRED EMBODIMENTS

The present invention is based on the discovery that the cathodic reactants, sulphur and polysulphide, separate into two layers at cell operation temperature (e.g. 280° to 375° C.), due to difference of density and liquid immiscibility. This separation takes place by gravity, and the upper layer consists of sulphur and the lower layer primarily of sodium polysulphide, in the form of $Na_2S_5$. The vapour pressure of sulphur at 350° C. is 140 Torr, whereas that of $Na_2S_5$ is 0.9 Torr. Therefore the space above the liquid layers is almost completely occupied with sulphur vapour. This sulphur vapour is permitted to reach the cathode reaction zone, at the vapour pressure of sulphur. The amount of sulphur required at the cathode reaction region during rated operation of the cell can be supplied to the cathode reaction region in this manner. Thus the discharge reaction of the cell can be maintained while maintaining the whole of the cell at a constant temperature. During charging, conversely, the sodium polysulphide is fed to the cathode reaction zone from the store for the cathodic reactants, this preferably being done by capillary action, e.g. through a porous material which selectively transfers the sodium polysulphide to the reaction zone, in preference over liquid sulphur. Furthermore, the porous material which provides capillary transfer of the sodium polysulphide can act as the cathode, which gives the cell low resistance.

Figure 1:
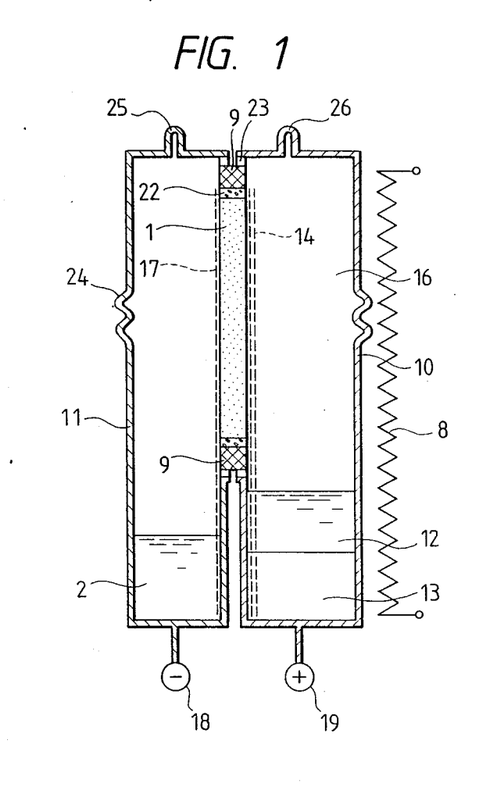
FIG. 1 is a vertical sectional view of a sodium-sulphur cell according to a first embodiment of the invention.

In the embodiment of FIG. 1, a plate-shaped $\beta''$-alumina solid electrolyte body 1 separates a cathode vessel 10 and an anode vessel 11 and provides sodium ion conductance between them. At its edges, the plate 1 is bonded to an $\alpha$-alumina insulator 9 by glass layers 22. The insulator 9 provides electronic and ionic insulation.

At its other side, the insulator 9 is bonded by a metal-ceramic diffusion bond 23 to the separate metal walls of the cathode and anode vessels 10,11. The walls 10,11 are made of stainless steel, or from Cr-coated iron. Bellows portions 24 in the side walls accommodate differing thermal expansions of the walls 10,11 and the ceramic plate 1. Inlets 25 and 26 are provided for sodium and cathodic reactants respectively. Anode and cathode connections are shown at 18 and 19 respectively. A heater 8 is shown diagrammatically outside the cell.

Both the anode vessel 11 and the cathode vessel 10 extend a considerable distance below the lower edge of the ceramic electrolyte plate 1, thus providing storage regions for the anodic reactant (liquid sodium) and the cathode reactants, liquid sulphur and liquid sodium polysulphide (primarily $Na_2S_5$). Both storage regions are spaced from the electrolyte 1. The liquid sodium is shown as a pool 2 at the bottom of the anode vessel 11. In the cathode vessel 12 the cathode reactants are in the form of a pool comprising two contacting liquid layers 12,13 of immiscible liquids. The upper layer 12 is sulphur and the lower layer 13 is primarily sodium polysulphide.

Inside the anode vessel 11 is an anode mesh of electrically conductive material 17 which provides a capillary path for supplying liquid sodium by capillary action from the pool 2 to the anode reaction region which is at the surface of the electrolyte 1. Similarly the cathode vessel 10 has a mesh 14 also of electrically conductive porous material, which acts as a cathode and reaches the bottom of the storage region so as to contact the layer 13 of sodium polysulphide and provide a capillary path for transfer of sodium polysulphide to the other surface of the solid electrolyte 1, where the cathodic reaction takes place. Sulphur vapour from the sulphur layer 12 can rise directly to contact the cathodic reaction region.

The meshes 14 and 17 are in this embodiment both made of woven mesh of stainless steels SUS304 or 316, with a mesh size of 350 (wires per inch), each wire having a diameter of 20 microns. Each electrode 14,17 is made of three sheets held face-to-face.

Operation of the cell of FIG. 1 will now be described. The cell operates at 280° to 375° C., preferably 300° to 350° C. The cell can be heated by suitable heating means, e.g. gas combustion, at a fixed temperature, e.g. 350° C., and electric charge and discharge take place at this temperature.

It is a particular advantage that the whole cell can be operated at a substantially uniform temperature. No part has to be maintained at a different temperature from another part. This uniform temperature may of course vary during operation.

During discharge, the gas space 16 adjacent the electrolyte 1 is filled with sulphur vapour, since the vapour pressure of $Na_2S_5$ is approximately 1% of that of sulphur at the temperature in question.

Figure 3:
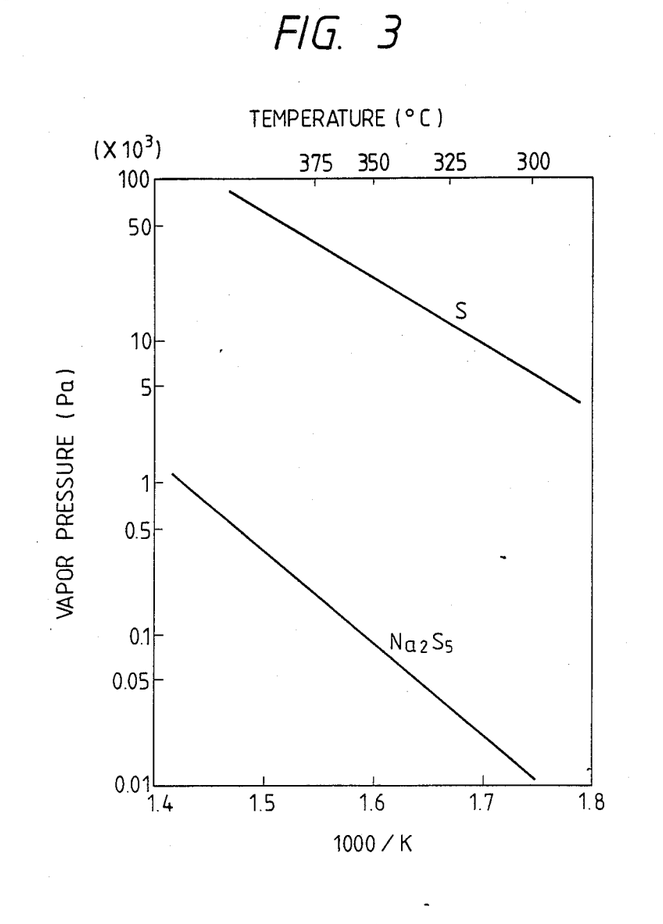
FIG. 3 is a graph illustrating the temperature dependency of the vapour pressure of sulphur and sodium polysulphide.

FIG. 3 shows the temperature dependency of vapour pressures of $Na_2S_5$ and sulphur. Over the cell operation temperature range of 280° to 370° C., the vapour pressure of S is greater than that of $Na_2S_5$ by nearly 100 times, at all temperatures.

The sulphur vapour molecules impinge upon the cathode mesh 14 which forms the cathode region, and react with sodium ions which have passed through the electrolyte 1, to form sodium polysulphide. The excess sodium polysulphide in the mesh 14 falls into the storage region and forms the lower layer 13, since sodium polysulphide has a greater density than sulphur.

Figure 4:
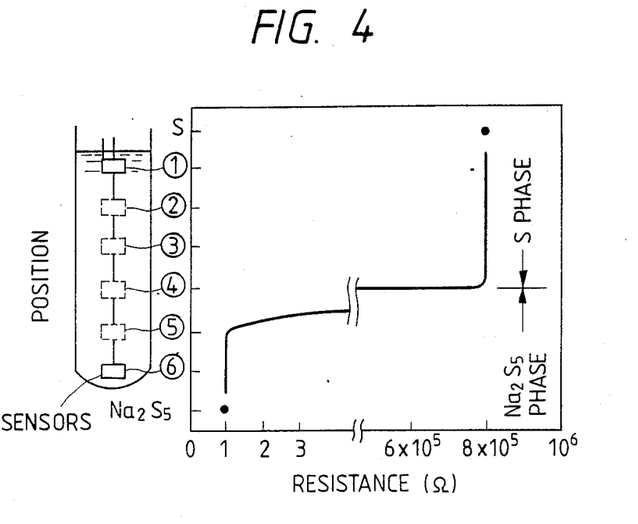
FIG. 4 is a graph illustrating the separation of liquid sulphur and polysulphide into two layers.

In order to arrive at the construction and operation of the cell of the invention, e.g. shown in FIG. 1, the present inventors have studied the process of separation of sodium polysulphide and sulphur into two layers. This is illustrated by FIG. 4. A test tube was filled with liquid sulphur and Na$_2$S$_5$ was poured in from above. The process of division into two layers was detected and observed by measuring the liquid resistance, utilizing the fact that Na$_2$S$_5$ is conductive while sulphur is insulating. FIG. 4 plots the electrical resistance against position in the test tube, and it can be seen that the resistance changes sharply at the location of the sensor no. 4, i.e. there is high resistance above the sensor no. 4 and low resistance below it. It was therefore discovered that sulphur stays above the Na$_2$S$_5$. The time required for seperation into two layers was less than 1 minute.

It was realized that Na$_2$S$_5$ formed by the discharge reaction of the cell collects at the bottom of the cathode vessel in a short period of time, and the free liquid surface is occupied by liquid sulphur at all times. As a result, the cathode gas space is filled with sulphur vapour at all times. If it is supposed that all the sulphur vapour molecules which collide with the cathodic reaction zone react with sodium, then the amount of sulphur supplied is 0.75 g/cm$^2$.s. This is greater than 10000 times the amount of sulphur necessary for a discharge rate of 100 mA/cm$^2$, which is an indication of a rated current of the sodium sulphur cell.

In practice, test cells have exhibited smooth discharge performance. The discharge voltage has remained stable, even when the current density is increased to 500 mA/cm$^2$.

Next, consideration must be given to the capillary transfer of the liquid sodium and the polysulphide to the reaction zone.

The speed of transfer of sodium in the porous mesh is determined by the capillary pressure which is the driving force for upward movement in the mesh and the pressure loss that is created as sodium rises. First the speed V for transfer is expressed as $$V = \frac{d^2 \epsilon_0^3}{80\mu(1-\epsilon_0)^2} \left( \frac{2\sigma}{rh} \right) - \rho g \quad (1)$$

where $r = (d+w)/2$, d is the diameter of a wire of the mesh, w is the spacing of the wires, $\sigma$ is surface tension of Na, h is height of rise of Na, $\epsilon_0$ is the percentage of voids of the mesh, $\mu$ is the viscosity and l the density of Na, and g is gravitational acceleration.

Figure 6:
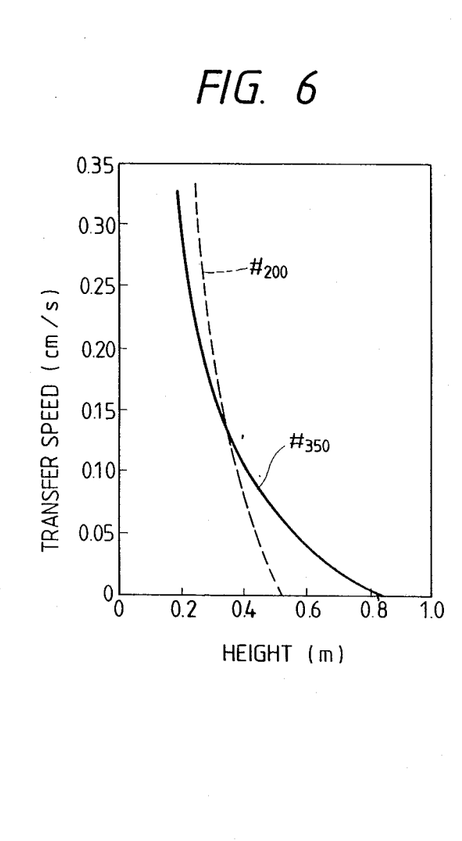
FIG. 6 is a graph showing the relationship between the transfer speed and height in capillary movement of sodium.

FIG. 6 shows the relationship between the speed of transfer of sodium in the mesh and the height of rise. From this it can be seen that the amount of sodium required for cell discharge can be supplied in appropriate amounts by selecting the mesh size of the anode mesh and the number of layers of mesh. The two lines of FIG. 6 indicate different mesh sizes. It can be achieved that the mesh is saturated over the whole surface area of the electrolyte plate 1, so that sodium is uniformly supplied over the whole plate.

Figure 5:
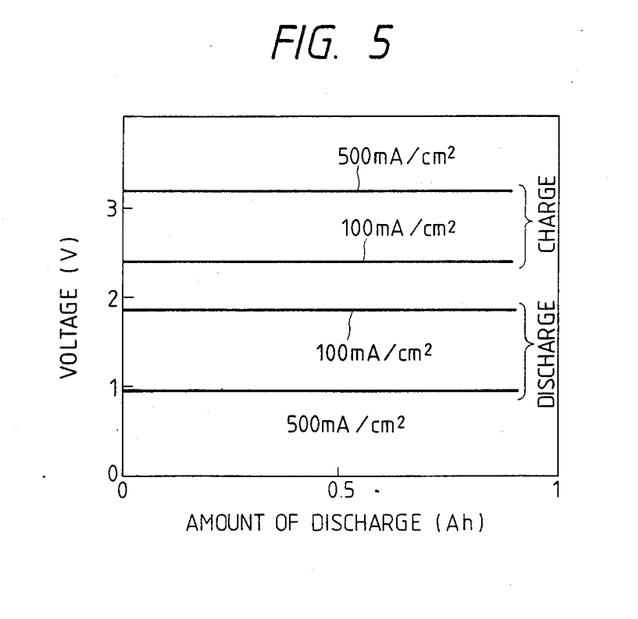
FIG. 5 is a graph showing charge and discharge characteristics of a cell embodying the present invention.

FIG. 5 shows the sole characteristics of the cell of FIG. 1, at 350° C., for two charge discharge rates. Steady charge and discharge voltages are obtained.

Figure 7:
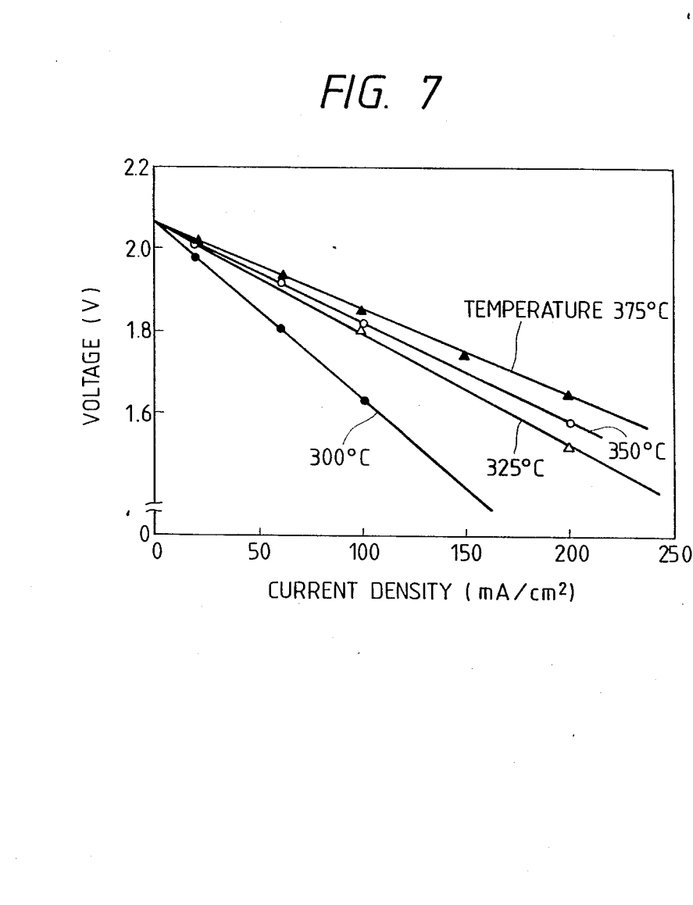
FIG. 7 is a graph showing the temperature dependency of the discharge behaviour of a cell embodying the present invention.

FIG. 7 shows cell characteristics when the operational temperature is varied, for four different temperatures. As the cell operating temperature is reduced, the resistance of the $\beta''$-alumina increases, and the discharge voltage decreases. However, stable discharge characteristics are obtained in all cases as shown.

Figure 8:
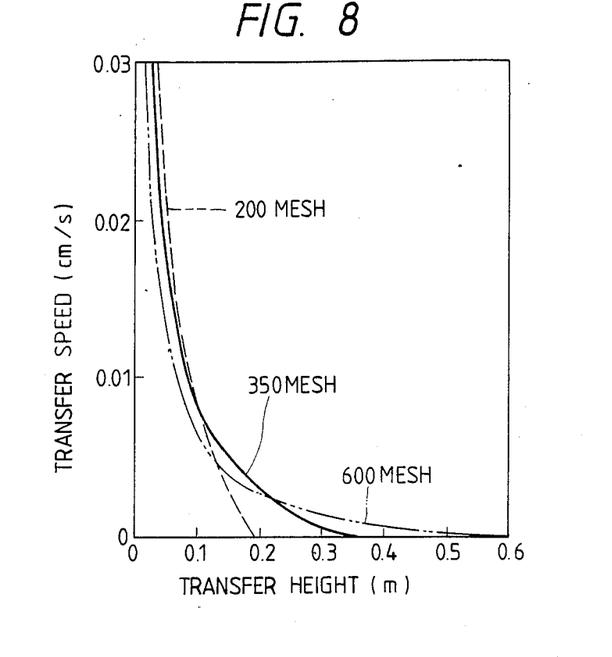
FIG. 8 is a diagram showing the transfer speed relative to height in capillary transfer of sodium polysulphide.

Next, the operation of the cell in charging mode is described. It has been found that the cathode mesh 14 used is more easily wet by liquid Na$_2$S$_5$ than by liquid sulphur. Therefore, although sulphur and Na$_2$S$_5$ are stored in two superposed layers 12,13, only the Na$_2$S$_5$ of the lower layer is moved by capillary action in the mesh 14 to the surface of the electrolyte. The relationship between the speed of transfer of Na$_2$S$_5$ and the height of the mesh can be expressed just as by the equation (1) for sodium. FIG. 8 shows the results of analysis at each of three mesh sizes. Saturation of the mesh 14 with Na$_2$S$_5$ over the whole face of the plate 1 is achieved.

During charging, sodium formed at the anodic reaction zone flows downwardly in the anode vessel into the pool 2, and correspondingly liquid sulphur formed at the cathodic region flows down along the surface of the mesh 14 and collects in the upper layer 12 in the storage region.

As mentioned above, the stainless steel which is used as the mesh 14 permits Na$_2$S$_5$ to pass by capillary action, while the sulphur does not pass. The degree of wetting of the mesh by a liquid is determined in dependence upon the bonding energy (wetting tension). The bonding energy is determined by (surface tension)×(cosine of contact angle). For stainless steel SUS304, the bonding energy of Na$_2$S$_5$ is 112 dynes/cm$^2$ and that of S is 40 dynes/cm$^2$. Therefore, Na$_2$S$_5$ passes through the stainless steel mesh preferentially.

In manufacturing the cell shown in FIG. 1, it is advantageous to wet the porous mesh 14 previously with Na$_2$S$_5$, in order to start the capillary action appropriately.

As FIG. 5 shows, stable charge characteristics are obtained, just as for discharge. The same applies at other temperatures.

Concerning the safety of the cell, the first point to note is that the electrolyte plate 1 is vertical and that the liquid levels of stored sodium in the anode vessel and the stored cathodic reactants in the cathode vessel are always maintained lower than the bottom edge of the plate 1. Secondly, sulphur is supplied in the form of vapour and polysulphide by the cathode mesh 14, while sodium is supplied by the anode mesh 17. Thus the amounts of reactants particularly sodium and sulphur, available to react directly, when the solid electrolyte is broken, are small. This leads to increased safety. In the embodiment of FIG. 1, even when for example the plate 1 is broken, the amounts of the reactants which directly react with each other are only those adhered to the mesh and there is no likelihood that the cell outer vessel is distroyed. It can be seen that the liquid sulphur is normally not abled to reach the solid electrolyte plate 1.

Figure 9:
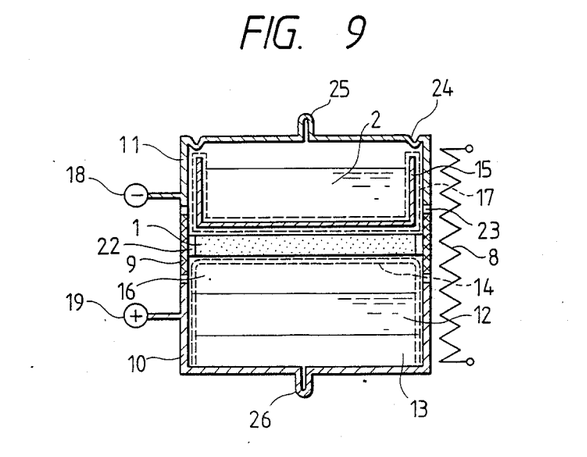
FIG. 9 is a vertical sectional view of a second sodium-sulphur cell embodying the present invention.

FIG. 9 illustrates the construction of the cell of the invention in another embodiment, in which is solid electrolyte is horizontal, rather than vertical as in FIG. 1. Other parts corresponding to the parts of FIG. 1 are not described but are given the same reference numerals in FIG. 9. The storage of the sodium pool 2 at a location away from the electrolyte 1 is achieved in this embodiment by means of a safety vessel 15 mounted above the electrolyte plate 1. The vessel 15 is closed except at its uppper side. Both the inner and outer surfaces of the vessel 15 are covered by an anode mesh 17 corresponding to the anode mesh of FIG. 1, and the sodium necessary for the cell reaction is supplied onto the surface of the electrolyte 1 by capillary action.

Figure 10:
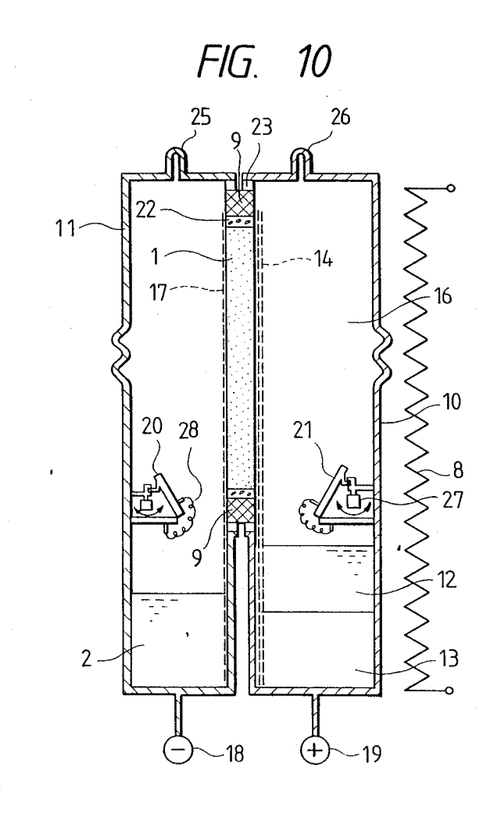
FIG. 10 is a vertical sectional view of the third sodium-sulphur cell embodying the present invention.

FIG. 10 shows an embodiment of the invention which is a modification of that of FIG. 1, and again parts corresponding to those of FIG. 1 will not be described and are given the same reference numbers. The additional features of this embodiment are designed to make it suitable for use for example an electric vehicle, in which it is particularly important to control the movement of the active materials under conditions of vibration in the vehicle and in case of accident. The liquid storage regions, at which the liquid layers 2,12 and 13 are present are filled with a wick-like material (not shown) such as fibrous metal or ceramics to restrain bulk movement of the liquids. This material is chosen so that it does not prevent the formation of the two liquid phases 12,13 of the cathode reactant store. Furthermore, shutters 20,21 are provided which can shut to close the storage regions of the cell from the solid electrolyte 1. The shutters are located at a height in the anode and cathode vessels between the top level of the liquid stored and the bottom level of the plate 1. Each shutter has a pivoted plate, which is biassed by a spring 28 into the closed position in which it shuts the vessel (apart from the mesh 14,17). The shutters are normally held in the open position by counter-weighted catches 27. Vibration of a predetermined level, or shock, causes the catches 27 to release the shutters 20,21 so as to close the cell and prevent accident. This protective measure is also effective against earthquakes.

Figure 11:
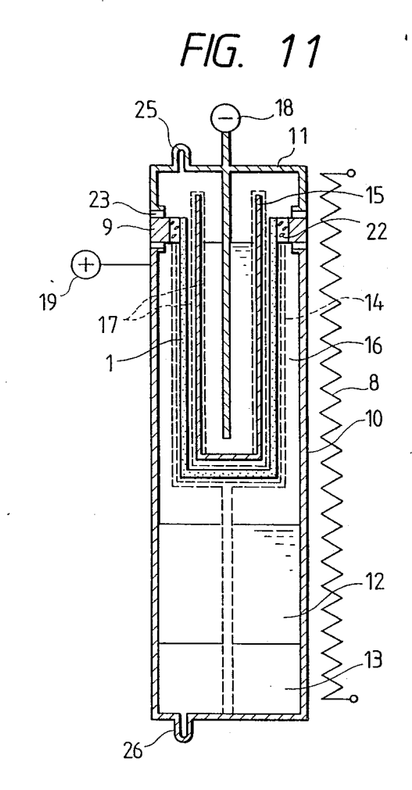
FIG. 11 is a vertical sectional view of a fourth sodium-sulphur cell embodying the present invention.

In the embodiment of FIG. 11, the electrolyte is a tube 1 of $\beta''$-alumina closed at its bottom, of a shape now widely available. In the tube 1 is a vessel 15 for the liquid sodium providing storage away from the electrolyte 1, in a similar manner as in the embodiment of FIG. 9. The anode mesh 17 is also corresponds that of FIG. 9. The cathode mesh 14 surrounds the tube 1 as illustrated. This embodiment has the advantage that dead space of the cell of FIG. 1 is avoided.

When used in load levelling, the high capacity and high efficiency of the sodium sulphur cell of the invention makes it especially effective to store electrical power during off-peak periods, i.e. periods when power demand generally is low, and to discharge the cell at peak power demand times. This may be done in a 24-hour cycle, with at least one charge period and at least one discharge period in the 24 hours. In connection with public power supply systems, the off-peak period is usually during the night, and the peak period during day time hours.

What is claimed is:
1. Sodium-sulphur cell having:
   (a) an anodic reaction zone,
   (b) sodium as anodic reactant,
   (c) a cathodic reaction zone,
   (d) a solid electrolyte disposed between said anodic and cathodic reaction zones for conducting Na+ ions,
   (e) a storage region for cathodic reactants away from said cathodic reaction zone,
   (f) sulphur and sodium polysulphide as cathodic reactants stored in said storage region in the form, at least when the cell is operational, of two contacting layers of immiscible liquids separated by gravitational separation, said stored reactants being out of contact with said cathodic reaction zone,
   (g) means for feeding sodium polysulphide to and fro between said cathodic reaction zone and said storage region,
   said storage region and said cathodic reaction zone being so connected as to permit sulphur vapor from the storage region to reach the cathodic reaction zone.

2. Sodium-sulphur cell according to claim 1, wherein said storage region and said cathodic reaction zone are connected by a vertically extending zone up which sulphur vapour passes to reach the cathodic reaction zone from the storage region.

3. Sodium-sulphur cell according to claim 1, wherein said means for feeding sodium polysulphide comprises capillary-action means by which said polysulphide moves from said contacting liquid layers to said cathodic reaction zone.

4. Sodium-sulphur cell according to claim 3, wherein said capillary-action means is mesh.

5. Sodium-sulphur cell according to claim 4, wherein said mesh is metal mesh.

6. Sodium-sulphur cell according to claim 1, further having a storage region for said sodium away from said anodic reaction zone, whereby stored sodium is maintained out of contact with said anodic reaction zone, and means for feeding liquid sodium to said anodic reaction zone.

7. Sodium sulphur cell according to claim 6, wherein both said storage regions are below the level of both said reaction zones.

8. Sodium sulphur cell according to claim 6, wherein said sodium feeding means comprises capillary-action means by which liquid sodium from said sodium storage region moves to said anodic reaction zone.

9. Sodium sulphur cell according to claim 8 wherein said capillary-action means is metal mesh.

10. In a sodium-sulphur cell in which liquid sodium is anodic reactant, sulphur and sodium polysulphide are cathodic reactants and sodium ions are conducted by a solid electrolyte, the improvement of a storage region for cathodic reactants away from said solid electrolyte containing said cathodic reactants in the form of two contacting layers of immiscible liquids formed by gravitational separation, whereby liquid sulphur being stored does not contact the solid electrolyte.

11. Sodium-sulphur cell according to claim 10, having capillary-action means for feeding said sodium polysulphide from said two liquid layers to the cathode reaction at said solid electrolyte.

12. Sodium-sulphur cell according to claim 10, wherein said liquid sodium is stored away from said solid electrolyte, whereby in the event of breakage of the solid electrolyte the stored anodic and cathodic reactants do not meet.

13. Sodium-sulphur cell having
   (a) an anodic reaction zone,
   (b) liquid sodium as anodic reactant,
   (c) a cathodic reaction zone,
   (d) liquid sulphur and liquid sodium polysulphide as cathodic reactants,
   (e) a solid electrolyte disposed between said anodic and cathodic reaction zones for conducting Na+ ions,
wherein at least one of said liquid sodium and said cathodic reactants is stored away from said solid electrolyte, said cell further comprising (f) shutter means operable to isolate said liquid sodium from said cathodic reactants, to prevent accidental mixing thereof.

14. Sodium-sulphur cell according to claim 13, having
   (a) vibration-sensing means arranged to operate said shutter means to effect isolation of the reactants when a vibration level beyond a predetermined threshold level is detected.

15. Sodium-suphur cell according to claim 13, wherein both said liquid sodium and said cathodic reactants are stored away from said solid electrolyte and two said shutter means are located to isolate respectively said liquid sodium and said cathodic reactants from said solid electrolyte.

16. Method of operating a sodium-sulphur cell having an anodic reaction zone, a cathodic reaction zone and a solid electrolyte conducting $Na^+$ ions between said reaction zones, comprising the operations of
   (a) providing liquid sodium at said anodic reaction zone,
   (b) storing liquid sulphur and liquid sodium polysulphide at a cathodic reactant storage location away from said cathodic reaction zone in the form of two contacting liquid layers of immiscible liquids,
   (c) permitting sulphur vapour to pass to said cathodic reaction zone from said storage location as required by the cell operating mode,
   (d) providing transfer of liquid sulphur from said cathodic reaction zone to said storage location as required by the cell operating mode,
   (e) providing transfer of said liquid polysulphide to and fro between said storage location and said cathodic reaction zone as required by the cell operating mode, and
   (f) preventing said liquid sulphur from passing to said cathodic reaction zone.

17. Method according to claim 16, wherein said operation (a) is performed by the operation of
   (i) storing liquid sodium at a sodium storage location away from said anodic reaction zone, and
   (ii) providing transfer of the liquid sodium to and fro between said sodium storage location and said anodic reaction zone as required by the cell operating mode.

18. Method according to claim 16, wherein said operation (e) is performed by capillary action.

19. Method according to claim 17, wherein said operation (ii) is performed by capillary action.

20. Method according to claim 16 including maintaining said reaction zones and said cathodic reactant storage location at substantially the same temperature at any time.

21. Method of storing electrical power to provide load levelling comprising charging at least one sodium-sulphur cell during a first portion of a given twenty-four hour period and discharging said cell during a subsequent portion of said twenty-four hour period, said sodium sulphur cell having:
   (a) an anodic reaction zone,
   (b) sodium as anodic reactant,
   (c) a cathodic reaction zone,
   (d) a solid electrolyte disposed between said anodic and cathodic reaction zones for conducting $Na^+$ ions,
   (e) a storage region for cathodic reactants away from said cathodic reaction zone,
   (f) sulphur and sodium polysulphide as cathodic reactants stored in said storage region in the form, at least when the cell is operational, of two contacting layers of immiscible liquids separated by gravitational separation, said stored reactants being out of contact with said cathodic reaction zone,
   (g) means for feeding sodium polysulphide to and fro between said cathodic reaction zone and said storage region,
   said storage region and said cathodic reaction zone being so connected as to permit sulphur vapour from the storage region to reach the cathodic reaction zone.

* * * * *